United States Patent [19]
Yamaguchi

[11] Patent Number: 5,258,851
[45] Date of Patent: Nov. 2, 1993

[54] MAGNETIC RECORDING/REPRODUCTION DEVICE FOR TCI SIGNALS

[75] Inventor: Takayoshi Yamaguchi, Nagareyama, Japan

[73] Assignee: Sharp Kabushiki Kaisha, Osaka, Japan

[21] Appl. No.: 631,686

[22] Filed: Dec. 21, 1990

[30] Foreign Application Priority Data

Dec. 27, 1989 [JP] Japan ................... 1-341026

[51] Int. Cl.⁵ .............. H04N 9/89; H04N 9/79; H04N 11/06; H04N 7/04
[52] U.S. Cl. ........................ 358/320; 358/12; 358/147; 358/310
[58] Field of Search ............... 358/310, 312, 314, 320, 358/323, 324, 326, 11, 12, 14, 142, 147

[56] References Cited

U.S. PATENT DOCUMENTS

| | | | |
|---|---|---|---|
| 4,758,898 | 7/1988 | Itou et al. | 358/320 |
| 4,910,605 | 3/1990 | Sasaki et al. | 358/310 |
| 5,034,823 | 7/1991 | Geerlings | 360/38.1 |
| 5,079,637 | 1/1992 | Amano | 358/310 |

*Primary Examiner*—Tommy Chin
*Assistant Examiner*—Thai Tran
*Attorney, Agent, or Firm*—David G. Conlin; Robert F. O'Connell

[57] ABSTRACT

In a VTR for TCI signals, horizontal synchronizing signal with different time width is inserted for identifying the chrominance signal component multiplexed in each recording line at the time of recording. At the time of reproduction, this horizontal synchronizing signal is separated to generate a signal identifying the chrominance signal component in the corresponding recording line. The chrominance signal sequence in the reproduced TCI signal indicated by the identification signal and the proper sequence of the chrominance signal process are compared, where both sequences are made to coincide with each other when there is discrepancy between both sequences to prevent the generation of hue error on a monitor.

11 Claims, 8 Drawing Sheets

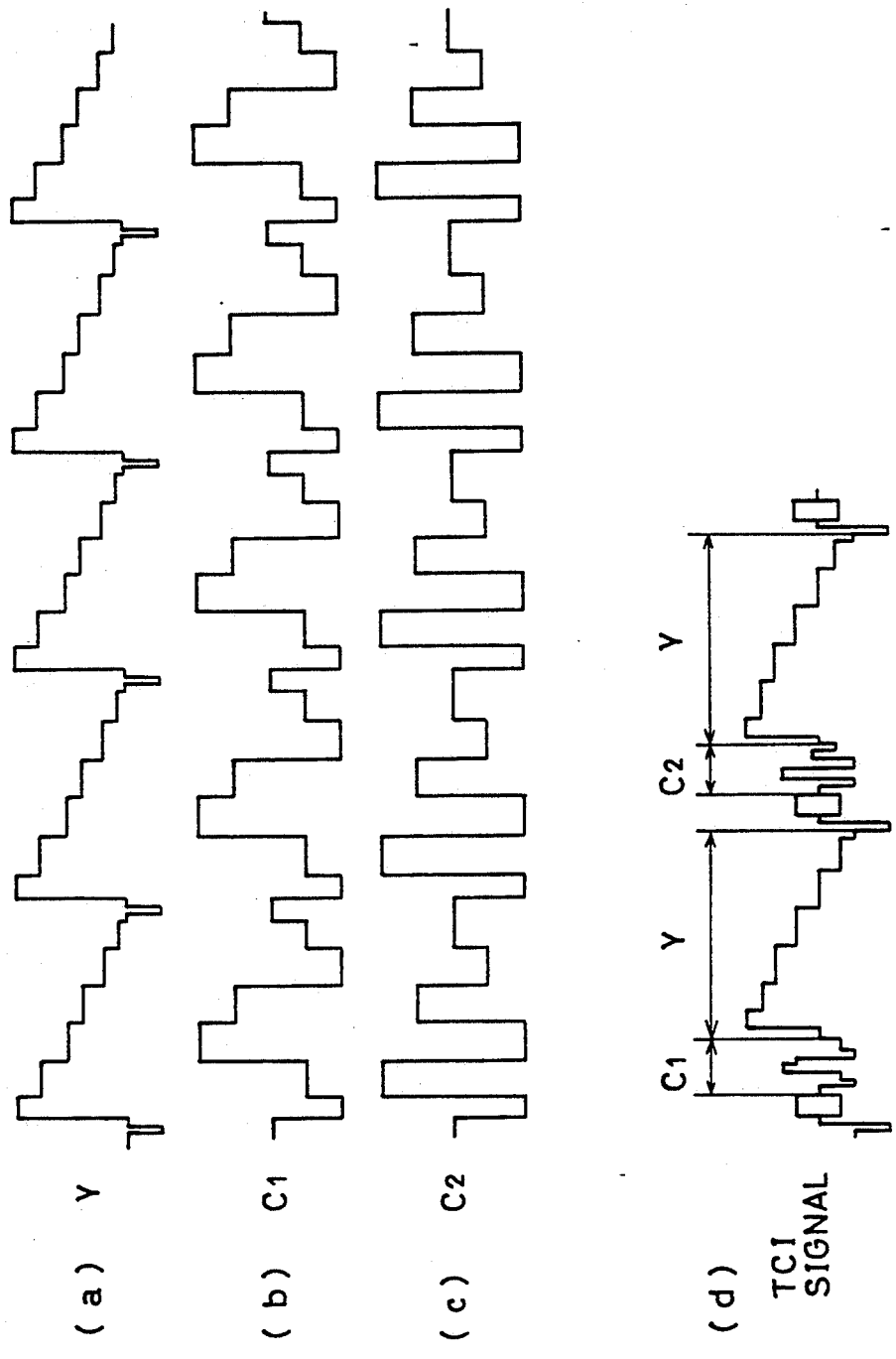

MAGNETIC RECORDING/REPRODUCTION DEVICE FOR TCI SIGNALS

BACKGROUND OF THE INVENTION

Field of the Invention

The present invention relates generally to magnetic recording/reproduction devices, and more particularly to a magnetic recording/reproduction device such as a video tape recorder (referred to as a VTR hereinafter) that records and reproduces TCI (Time Compressed Integration) signals obtained by time base compressing each of the luminance signal and the chrominance signal and time-divisionally multiplexing both.

Description of the Background Art

In recent years, the demand for high quality television image is rapidly increasing, whereby the so-called high definition television system is being developed to meet these requirements. The development of associated equipments is also in advance to implement the high definition television system. One such equipment is a VTR employing a TCI signal as the recording signal format. This TCI signal is obtained by time base processing a luminance signal as well as a color line sequential signal obtained by applying line sequential processing to two chrominance signals (for example, color difference signals) C1 and C2, and time-divisionally multiplexing these signals in the same recording line (one horizontal scanning period). Such VTRs are disclosed in the technical reports of the Institute of Television Engineers of Japan, Vol. 13 No. 50, pp. 1-6, VIR 89-12, Vol. 13, No. 50, pp. 7-12, VIR 89-13, for example.

FIG. 1 is a block diagram showing a TBC (Time Base Corrector) circuit as an example of a reproduction processing system of a VTR for the above mentioned TCI signal. The reproduction of an FM modulated TCI signal recorded on a magnetic tape will be explained hereinafter.

Referring to FIG. 1, FM signals reproduced by magnetic heads 22a and 22b from respective tracks on a magnetic tape 21 are amplified at the corresponding reproduction amplifiers 23a and 23b, and provided to a switching circuit 24 to be converted into a continuous reproduced TCI signal. The reproduced TCI signal is provided to an FM demodulator 14 to be FM demodulated. The reproduced TCI signal provided from FM-demodulator 14 is applied to an A/D converter 17, a writing clock generator 15, and a synchronizing signal separating circuit 16. Writing clock generator 15 generates a write clock signal Wck phase-synchronized with the reproduced TCI signal, and provides the same to A/D converter 17 and to a TBC line memory 18. The synchronizing signal separating circuit 16 separates the horizontal synchronizing signal from the reproduced TCI signal and provides the same to TBC line memory 18.

A/D converter 17 is responsive to writing clock signal Wck from writing clock generator 15 to convert the reproduced TCI signal into a digital signal, and provides the same to TBC line memory 18 for time base correction. This digital TCI signal is written into TBC line memory 18 for each 1 horizontal line at the timing of writing clock signal Wck.

Then, digital data corresponding to the reproduced TCI signal is read out from TBC line memory 18 according to the timing of a read out clock signal Rck provided from a reference signal generator 20, whereby time base correction of the reproduced TCI signal is carried out. TBC line memory 18 is implemented so as to allow asynchronous access for writing and reading. The reproduced TCI signal read out from TBC line memory 18 is provided to a TCI decoder 19. TCI decoder 19 carries out time base process to the reproduced TCI signal according to the timing signal provided from reference signal generator 20 to restore a luminance signal Y and chrominance signals C1 and C2.

It is known that the magnetic head for reproduction traverses a plurality of tracks for scanning in a reproduction mode other than the normal reproduction, i.e. in variable speed reproduction, in a conventional VTR of FIG. 1. FIG. 2 is a waveform chart of a reproduced TCI signal in variable speed reproduction. When the head for reproduction moves from a track to the adjacent track in variable speed reproduction, there is a period where the reproduction of the TCI signal is not possible, as shown in FIG. 2. The reproduction horizontal synchronizing signal will be missing in such a period.

FIG. 3 is a diagram schematically showing the color line sequence manner of a TCI signal, in which (a) shows the chrominance signal sequence of the TCI signal actually applied to TCI decoder 19, and (b) shows the proper chrominance signal processing sequence in TCI decoder 19. If the horizontal synchronizing signal is missing in the reproduced TCI signal, there is discrepancy between the chrominance signal sequence (a) actually applied to TCI decoder 19 and the chrominance signal sequence (b) that should have been applied to TCI decoder 19, as shown in FIG. 3. This discrepancy will cause chrominance signal component C1 multiplexed in the TCI signal to be decoded as chrominance signal component C2, and chrominance signal component C2 decoded as C1 by TCI decoder 19. This results in the occurrence of hue error at the time of variable speed reproduction of the VTR, leading to a problem that it was difficult to reproduce color information of the reproduced video signal on the monitor in a stable manner.

Similarly, hue error is generated on the monitor in case of some malfunction in line management of the TBC circuit even at the time of normal reproduction.

A method is disclosed in Japanese Patent Laying-Open No. 60-214693 to identify in advance the chrominance signal sequence of the TCI signal at the time of recording. However, this method requires a separate creation of a color discrimination signal and insertion into the TCI signal, not allowing to increase sufficiently the time width of the color discrimination signal. Insufficient time width of the color discrimination signal will make it difficult to detect the color discrimination signal at the time of reproduction of the TCI signal, with the possibility of erroneous determination of chrominance signal sequence.

SUMMARY OF THE INVENTION

An object of the present invention is to allow the stable reproduction of a chrominance signal in a magnetic recording/reproduction device adopting a TCI signal as the recording signal format.

Another object of the present invention is to prevent the generation of the hue error particularly at the time of variable speed reproduction, in a magnetic recording/reproduction device adopting a TCI signal as the recording signal format.

Briefly stated, the present invention is a magnetic recording/reproduction device for a TCI signal including alternately a first recording line having a luminance signal and a first chrominance signal time-divisionally multiplexed and a second recording line having a luminance signal and a second chrominance signal time-divisionally multiplexed. The magnetic recording/reproduction device includes a synchronizing signal adding circuit, an FM recording circuit, an FM reproducing circuit, a synchronizing signal separating circuit, a chrominance signal determining circuit, a TCI signal decode circuit, and a sequence control circuit. The synchronizing signal adding circuit adds first and second horizontal synchronizing signals each having a different time width to the first and second recording lines of the TCI signal. The FM recording circuit FM records on a magnetic tape the TCI signal having first and second horizontal synchronizing signals added. The FM reproducing circuit FM-reproduces the TCI signal from the magnetic tape. The synchronizing signal separating circuit separates first and second horizontal synchronizing signals from the reproduced TCI signal. The chrominance signal determining circuit is responsive to the time width of the separated horizontal synchronizing signal to make determination whether the chrominance signal multiplexed on the recording line of the reproduced TCI signal is a first chrominance signal or a second chrominance signal. The decode circuit decodes the reproduced TCI signal and restores a luminance signal and first and second chrominance signals. The sequence control circuit is responsive to the determination result of the chrominance signal determining circuit to control the decode sequence of the first and second chrominance signals by the decode circuit.

The main advantage of the present invention lies in that it is possible to correct the discrepancy between the chrominance signal sequence to be decoded and the proper sequence at the time of reproduction by setting the time width of the horizontal synchronizing signal of the TCI signal according to the type of the chrominance signal of the corresponding recording line at the time of recording, preventing the generation of hue error.

Another advantage of the present invention lies in that erroneous detection of color determination signal is prevented at the time of special reproduction due to the fact that determination of chrominance signals are carried out using the time width of the horizontal synchronizing signal of the TCI signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a waveform chart describing the method of creating a TCI signal.

DESCRIPTION OF THE PREFERRED EMBODIMENTS

Figure 4:
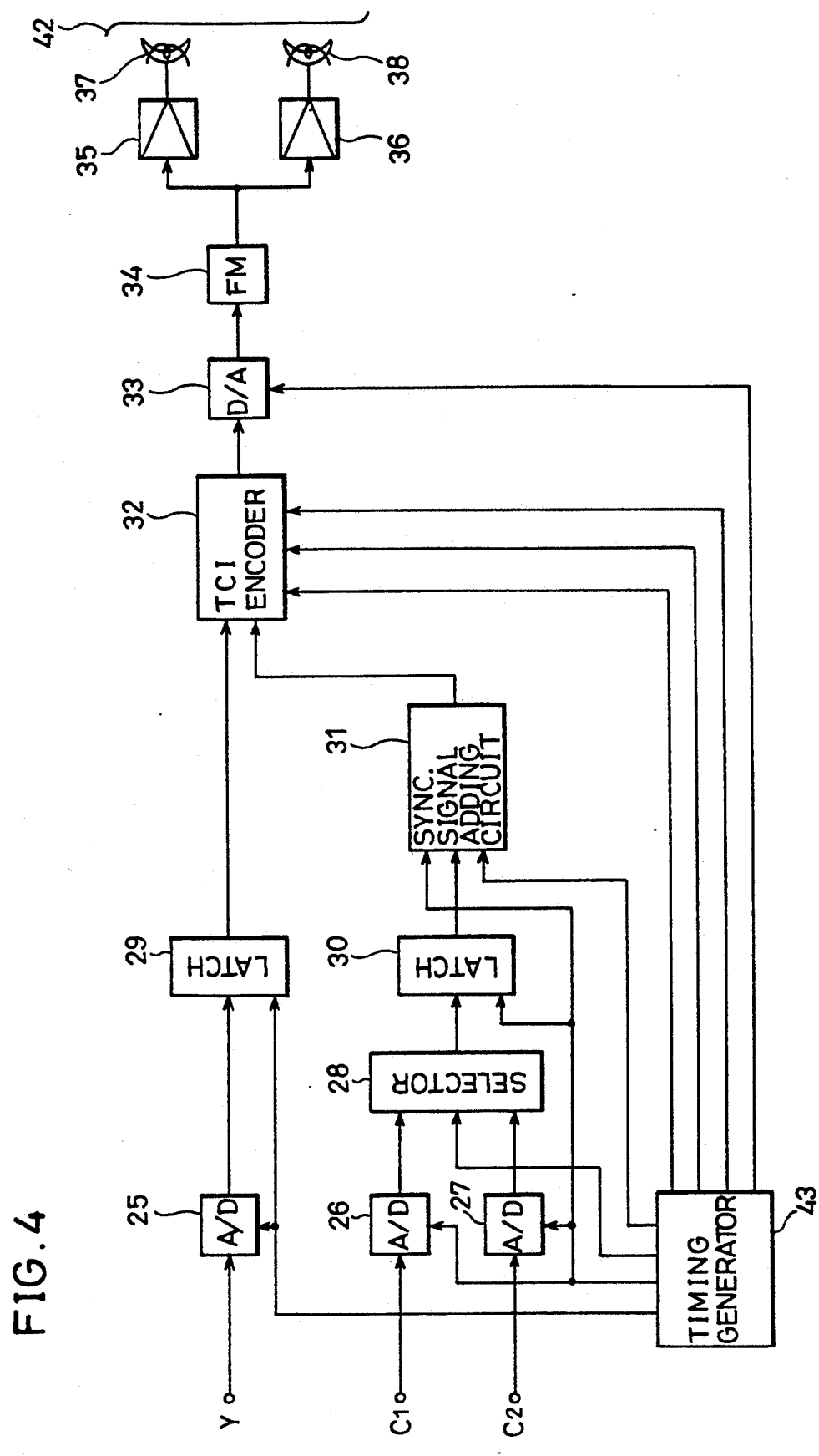
FIG. 4 is a block diagram showing the recording system of a VTR of an embodiment of the present invention.
Figure 7A:
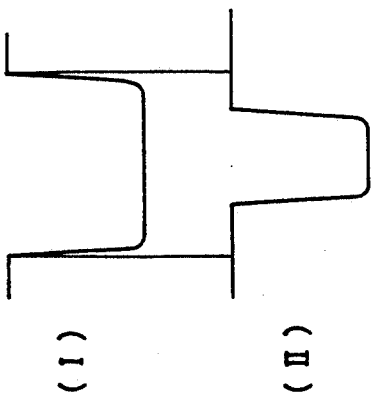
FIGS. 7A, 7B and 7C are waveform charts each showing the horizontal synchronizing signal of a TCI signal according to the present invention.
Figure 7B:
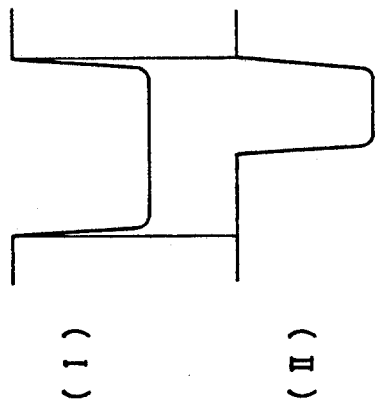
Figure 7C:
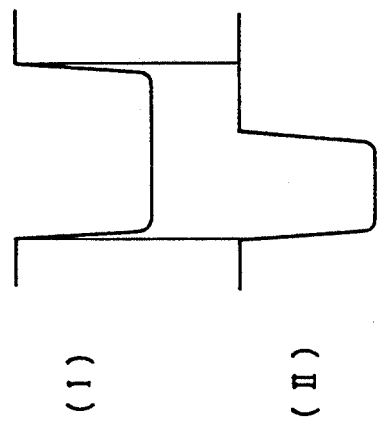

FIG. 4 is a block diagram showing a recording system of a VTR of an embodiment of the present invention. FIG. 6 is a waveform chart showing a general method of creating a TCI signal. Referring to FIGS. 4 and 6, a luminance signal and two chrominance signal components C1 and C2 forming a video signal are converted into digital signals by A/D converters 25, 26 and 27, respectively, according to the timing signal from a timing generator 43. The digital chrominance signal component C1 (FIG. 6(b)) provided from A/D converter 26 and digital chrominance signal component C2 (FIG. 6(c)) provided from A/D converter 27 are subjected to line sequential process for every 1 horizontal period, by a selector 28 switching controlled for every 1 horizontal period by the timing signal from timing generator 43. The result is latched in a latch circuit 30. The digital luminance signal Y (FIG. 6(a)) provided from A/D converter 25 is latched in a latch circuit 29. Luminance signal Y latched in latch circuit 29 is applied to a TCI encoder 32. The line sequential processed chrominance signal latched in latch circuit 30 is also provided to TCI encoder 32 via a synchronizing signal adding circuit 31 which will be described later. In TCI encoder 32, chrominance signal C1 and luminance signal Y are time-divisionally multiplexed at a horizontal period, and chrominance signal C2 and luminance signal Y are time-divisionally multiplexed at the next horizontal period (FIG. 6(d)). The output of TCI encoders 32 is converted into an analog signal by D/A converter 33 and provided to FM demodulator 34. TCI encoder 32 and D/A converter 33 are controlled by the timing signal from timing generator 43. The output of D/A converter 33 is FM demodulated by FM demodulator 34 to be FM recorded on respective tracks of a magnetic tape 42 through magnetic heads 37 and 38 after current control by recording amplifiers 35 and 36. In the present embodiment of the invention, information regarding the chrominance signal in the corresponding recording line (horizontal scanning period), i.e. the information concerning whether chrominance signal component multiplexed in the corresponding line is either C1 or C2 is indicated depending upon whether the time width of the negative horizontal synchronizing signal in the TCI signal is broad or narrow. Therefore, two types of negative waveform signals are used as the horizontal synchronizing signal in the TCI signal, as shown in FIG. 7A. (I) of FIG. 7A shows a waveform of a horizontal synchronizing signal when the chrominance signal multiplexed in the corresponding line is C1, whereas (II) shows a waveform of a horizontal synchronizing signal when the chrominance signal multiplexed in the corresponding line is C2. (I) of FIG. 7A may show chrominance signal component C2 and (II)

may show chrominance signal component C1 conversely. The combination of the waveforms of the horizontal synchronizing signal for identifying two chrominance signal components C1 and C2 is not limited to that shown in FIG. 7A, and the combinations shown in FIGS. 7B and 7C may also be used.

Figure 8:
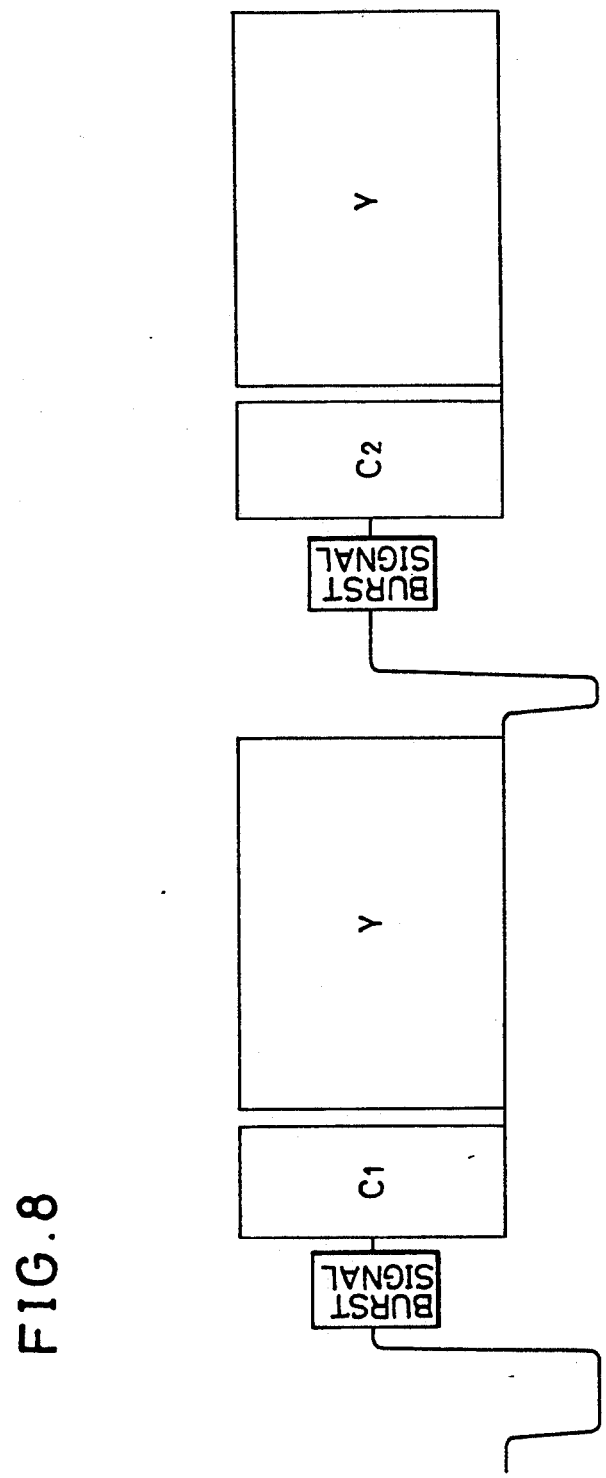
FIG. 8 is a waveform chart showing schematically the structure of a TCI signal.

In the recording system of the VTR of FIG. 4, the horizontal synchronizing signal having a different time width is inserted at the head of the chrominance signal component of the corresponding recording line, by synchronizing signal adding circuit 31. As a result, a TCI signal encoded as shown in FIG. 8 is recorded on magnetic tape 42.

Figure 5:
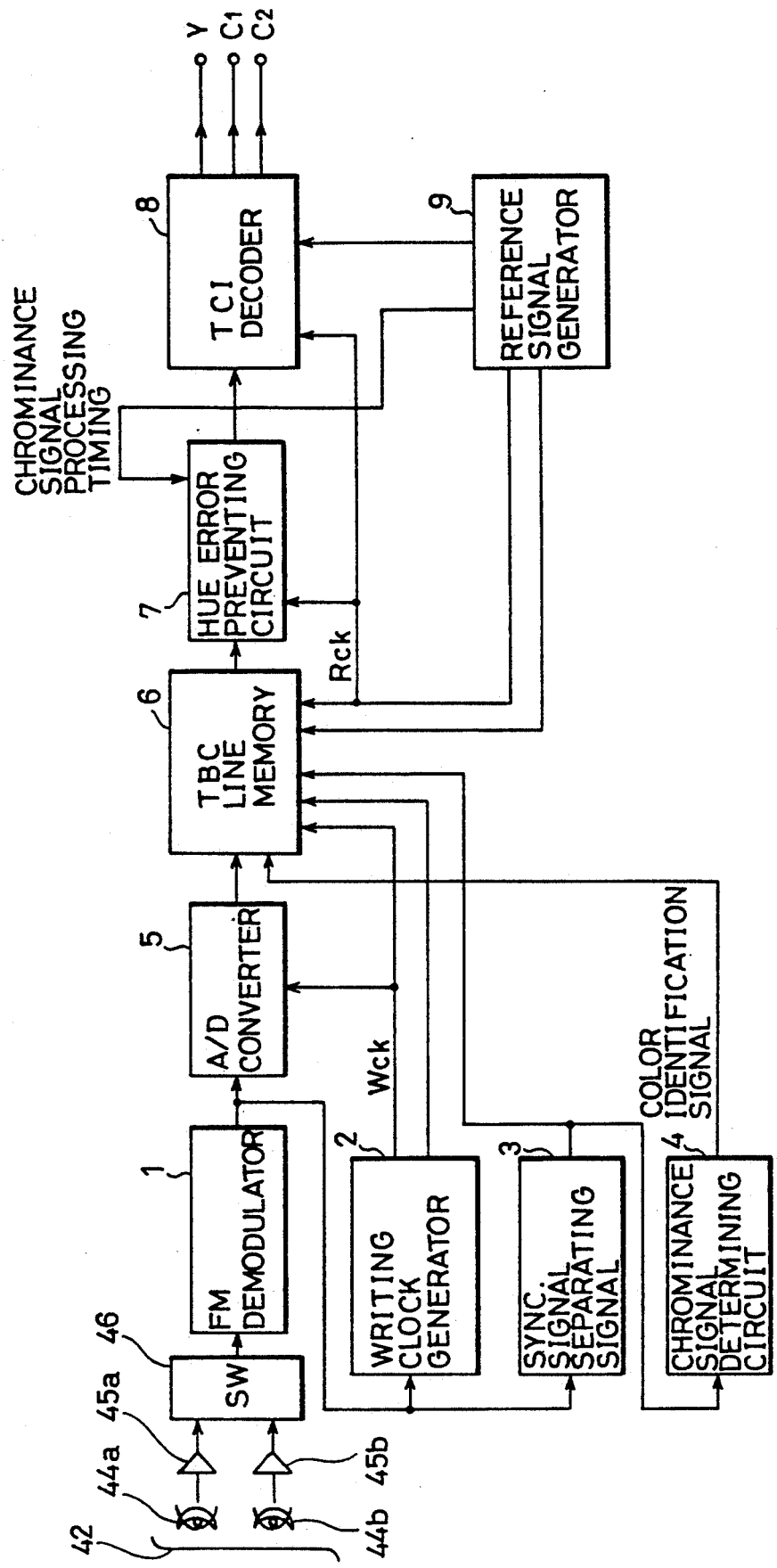
FIG. 5 is a block diagram showing the reproduction system of a VTR of an embodiment of the present invention.

FIG. 5 is a block diagram showing a TBC circuit of the reproduction system of a VTR according to an embodiment of the present invention. Referring to FIG. 5, FM signals of two tracks reproduced from magnetic tape 42 by magnetic heads 44a and 44b are amplified by the corresponding reproduction amplifiers 45a and 45b, where the same are applied to switching circuit 46 to be converted into a continuous reproduced TCI signal. The reproduced TCI signal is applied to a FM demodulator 1 to be FM demodulated. The reproduced TCI signal provided from FM demodulator 1 is applied to an A/D converter 5, a writing clock generator 2 and a synchronizing signal separating circuit 3. The writing clock generator 2 generates a writing clock signal Wck phase-synchronized with the reproduced TCI signal and provides the same to A/D converter 5 and a TBC line memory 6. The synchronizing signal separating circuit 3 separates the horizontal synchronizing signal from the reproduced TCI signal, and provides the same to TBC line memory 6 and a chrominance signal determining circuit 4. Chrominance signal determining circuit 4 detects the time width of the horizontal synchronizing signal separated by synchronizing signal separating circuit 3 to identify the chrominance signal component (C1 or C2) multiplexed in the corresponding reproduced line (horizontal scanning period). This circuit 4 generates a digital data (color identification signal) indicating the result as a binary of "1" or "0", whereby the same is provided to TBC line memory 6.

A/D converter 5 is responsive to writing clock signal Wck from writing clock generator 2 to convert the reproduced TCI signal into a digital signal, and provides the same to TBC line memory 6 for time base correction. The aforementioned color identification signal is inserted in the horizontal blanking portion of the provided TCI signal. This TCI signal is written into TBC line memory 6 for every 1 horizontal line at the timing of writing clock signal Wck. Data in the region excluding the region associated with chrominance signals and luminance signal are not necessary for further signal processing regarding the reproduced TCI signal after the A/D conversion by A/D converter 5. Therefore, it is possible to insert color identification signals, as mentioned above, in regions other than the above mentioned region of the data. TBC line memory 6 is implemented to carry out writing and reading asynchronously.

In response to the timing of the read out clock signal Rck provided from reference signal generator 9, digital data corresponding to the reproduced TCI signal is read out from TBC line memory 6 carrying out time base correction of the reproduced TCI signal. The reproduced TCI signal read out from TBC line memory 6 is provided to hue error preventing circuit 7.

Figure 1:
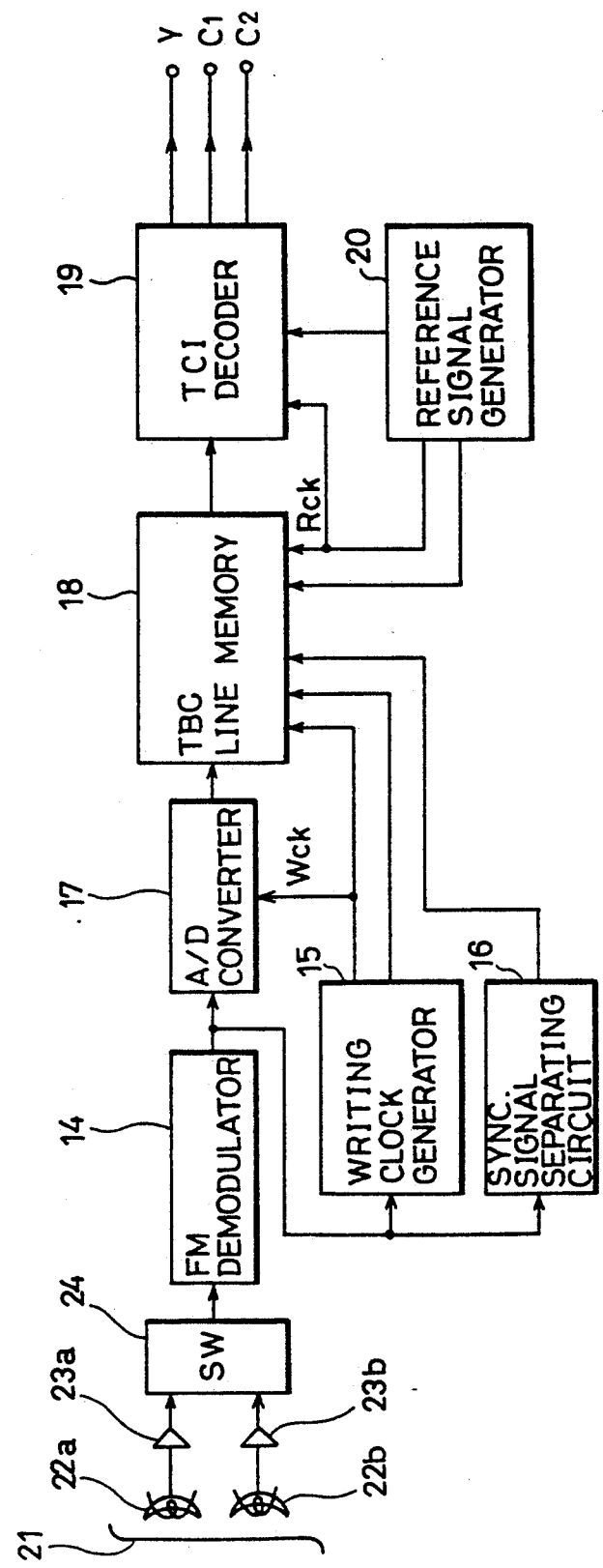
FIG. 1 is a block diagram showing an example of a reproduction process system of a conventional VTR for TCI signals.
Figure 2:
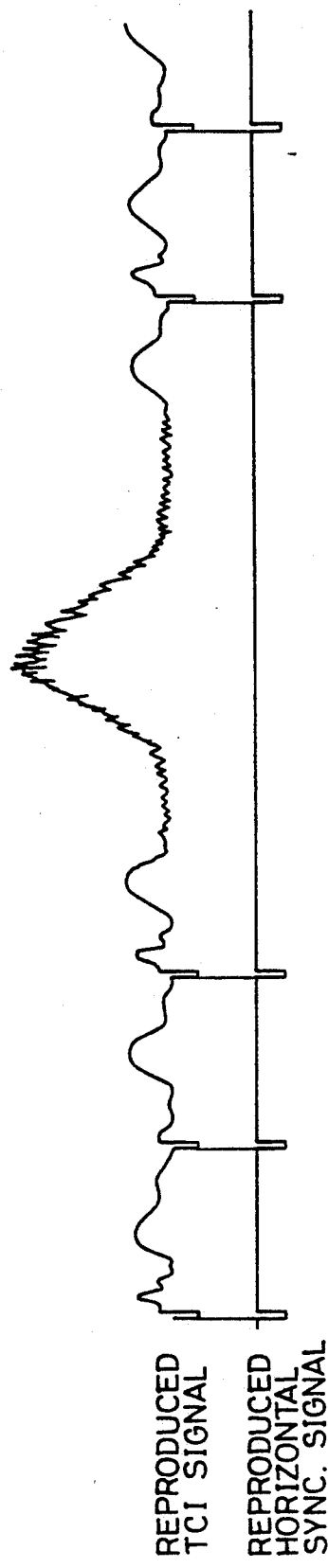
FIG. 2 is a waveform chart showing a reproduced TCI signal at the time of variable speed reproduction.
Figure 3:
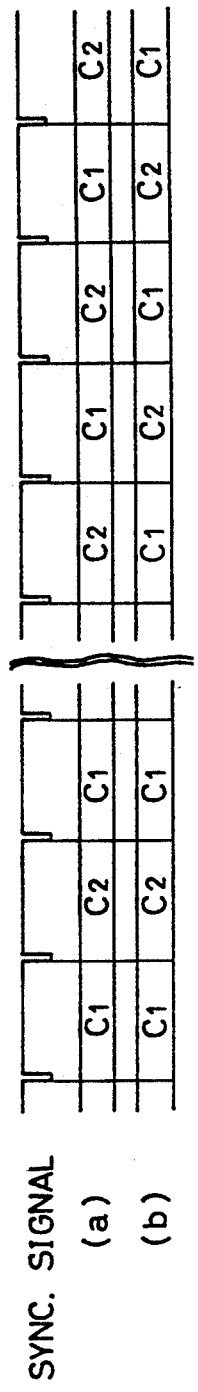
FIG. 3 is a diagram showing schematically the color line sequence of a TCI signal.
Figure 9:
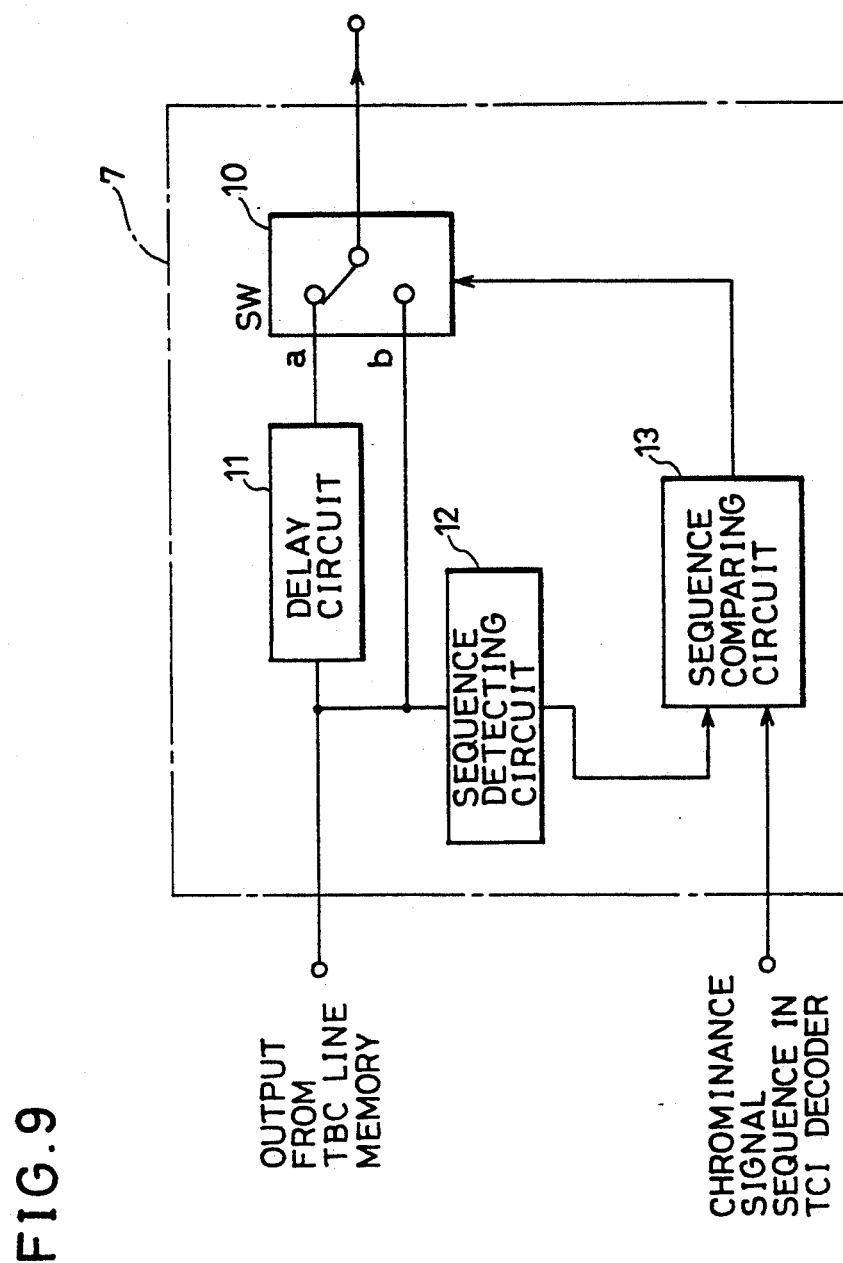
FIG. 9 is a block diagram showing in detail a hue error preventing circuit of FIG. 5.

FIG. 9 is a block diagram showing the hue error preventing circuit 7 of FIG. 5. Referring to FIG. 9, the TCI signal provided from TBC line memory 6 is applied to sequence detecting circuit 12, where the chrominance signal component sequence of the reproduced TCI signal is determined according to the color identification signal inserted in the horizontal blanking portion. The signal showing the proper chrominance signal processing sequence of TCI decoder 8 is provided from reference signal generating circuit 9 to hue error preventing circuit 7, whereby the actually detected chrominance signal sequence and the proper chrominance signal sequence are compared in sequence comparing circuit 13. If there is discrepancy between these sequences as shown in FIG. 3, a switch 10 connects to contact a side, whereby the reproduced TCI signal is delayed by delay circuit 11 for 1 horizontal scanning period to make both sequences coincide. Then the reproduced TCI signal is provided to TCI decoder 8. When there is no discrepancy between these sequences, switch 10 is connected to the contact b side, whereby the reproduced TCI signal provided from TBC line memory 6 is directly applied to TCI decoder 8. TCI decoder 8 is responsive to the timing signal provided from reference signal generator 9 to carry out time base process to the reproduced TCI signal for restoring luminance signal Y and chrominance signals C1 and C2.

According to the embodiment of the present invention, it is possible to reproduce chrominance signals in a stable manner on a monitor even at the time of variable speed reproduction in a VTR employing TCI signals as the recording signal format.

It is also possible to prevent the generation of hue error on a monitor even in the case where some malfunction occurs in line management of the TBC circuit at the time of normal reproduction besides variable speed reproduction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproduction device for recording and reproducing a time compressed integration signal obtained by time-divisionally multiplexing in one horizontal period a luminance signal and line sequential processed chrominance signals, said time compressed integration signal including alternately a firsts recording line having said luminance signal and a first chrominance signal time-divisionally multiplexed, and a second recording line having said luminance signal and a second chrominance signal time-divisionally multiplexed, said magnetic recording/reproduction device comprising:

synchronizing signal adding means for adding first and second horizontal synchronizing signals each having a different time width to first and second recording lines of said time compressed integration signal at the time of recording, means for frequency modulated recording on a magnetic recording medium said time compressed integration signal having said first and second horizontal synchronizing signals added, means for frequency modulated reproducing said time compressed integration signal from said magnetic recording medium, synchronizing signal separating means for separating said first and second horizontal synchronizing signals from said reproduced time compressed integration signal, means responsive to the time width of said separated horizontal synchronizing signal for making determination whether the chrominance signal multiplexed on the recording line of the time compressed integration signal reproduced by said frequency modulated reproducing means is said first chrominance signal or said second chrominance signal, decode means for decoding said reproduced time compressed integration signal to restore said luminance signal and said first and second chrominance signals, and means responsive to the determination result of said determining means for controlling the decode sequence of said first and second chrominance signals by said decode means.

2. The recording/reproduction device according to claim 1, further comprising time base corrector line memory means connected between said frequency modulated reproducing means and said decode means for applying time base correction to said reproduced time compressed integration signal.

3. The recording/reproduction device according to claim 2, wherein said determining means generates a color identification signal indicating the determination result of said chrominance signal to provide the same to said time base corrector line memory means, and said time base corrector line memory means inserts said color identification signal into a region other than the region of said luminance signal and said chrominance signal of said reproduced time compressed integration signal.

4. The magnetic/reproduction device according to claim 3, further comprising means for generating a signal showing the proper sequence of the chrominance signal process by said decode means.

5. The recording/reproduction device according to claim 4, wherein said sequence control means comprises means responsive to said color identification signal inserted in said reproduced time compressed integration signal for detecting the chrominance signal sequence of the reproduced time compressed integration signal provided from said time base corrector line memory means, means for comparing said detected chrominance signal sequence with the proper sequence of said chrominance signal process, and means responsive to the comparison result by said comparing means for making the detected chrominance signal sequence coincide with the proper sequence of the chrominance signal process.

6. A magnetic reproduction device for reproducing a time compressed integration signal obtained by time-divisionally multiplexing in one horizontal period a luminance signal and line sequential processed chrominance signals, said time compressed integration signal including alternately a first recording line having said luminance signal and a first chrominance signal time-divisionally multiplexed, and a second recording line having said luminance signal and a second chrominance signal time-divisionally multiplexed, said magnetic reproduction device comprising:

means for frequency modulated reproducing said time compressed integration signal from a magnetic recording medium, synchronizing signal separating means for separating first and second horizontal synchronizing signals, each having a different time width, from said reproduced time compressed integration signal, means responsive to the time width of said separated horizontal synchronizing signal for making determination whether the chrominance signal multiplexed on the recording line of the time compressed integration signal reproduced by said frequency modulated reproducing means is said first chrominance signal or said second chrominance signal, decode means for decoding said reproduced time compressed integration signal to restore said luminance signal and said first and second chrominance signals, and means responsive to the determination result of said determining means for controlling the decode sequence of said first and second chrominance signals by said decode means.

7. The reproduction device according to claim 6, further comprising time base corrector line memory means connected between said frequency modulated reproducing means and said decode means for applying time base correction to said reproduced time compressed integration signal.

8. The reproduction device according to claim 7, wherein said determining means generates a color identification signal indicating the determination result of said chrominance signal to provide the same to said time base corrector line memory means, and said time base corrector line memory means inserts said color identification signal into a region other than the region of said luminance signal and said chrominance signal of said reproduced time compressed integration signal.

9. The reproduction device according to claim 8, further comprising means for generating a signal showing the proper sequence of the chrominance signal process by said decode means.

10. The reproduction device according to claim 9, wherein said sequence control means comprises means responsive to said color identification signal inserted in said reproduced time compressed integration signal for detecting the chrominance signal sequence of the reproduced time compressed integration signal provided from said time base connector line memory means, means for comparing said detected chrominance signal sequence with the proper sequence of said chrominance signal process, and means responsive to the comparison result by said comparing means for making the detected chrominance signal sequence coincide with the proper sequence of the chrominance signal process.

11. A magnetic recording device for recording a time compressed integration signal obtained by time-divisionally multiplexing in one horizontal period a luminance signal and line sequential processed chrominance signals, said time compressed integration signal including alternately a first recording line having said luminance signal and a first chrominance signal time-divisionally multiplexed, and a second recording line having said luminance signal and a second chrominance signal time-divisionally multiplexed, said magnetic recording device comprising:

synchronizing signal adding means for adding first and second horizontal synchronizing signals, each having a different time width corresponding to one of said first and second chrominance signals, to first and second recording lines of said time compressed integration signal at the time of recording, means for frequency modulated recording on a magnetic recording medium said time compressed integration signal having said first and second horizontal synchronizing signals added.

* * * * *